United States Patent [19]
Preston et al.

[11] Patent Number: 5,300,841
[45] Date of Patent: Apr. 5, 1994

[54] INDUCTIVE AIR GAP ESTIMATION METHOD FOR ACTIVE MAGNETIC BEARINGS

[75] Inventors: Mark A. Preston; James P. Lyons, both of Niskayuna, N.Y.

[73] Assignee: General Electric Company, Schenectady, N.Y.

[21] Appl. No.: 970,194

[22] Filed: Nov. 2, 1992

[51] Int. Cl.⁵ .......................... H02K 7/09; G01B 7/14
[52] U.S. Cl. .................... 310/90.5; 324/207.13
[58] Field of Search ............................ 310/90.5, 68.13; 324/207.13, 207.15, 207.16

[56] References Cited

U.S. PATENT DOCUMENTS

| | | | |
|---|---|---|---|
| 4,504,098 | 3/1985 | Battarel et al. | 310/90.5 |
| 4,629,262 | 12/1986 | Hamilton | 310/90.5 |
| 4,652,820 | 3/1987 | Maresca | 310/90.5 X |
| 5,003,211 | 3/1991 | Groom | 310/90.5 |
| 5,036,236 | 7/1991 | Wilson | 310/90.5 |
| 5,051,637 | 9/1991 | Harris et al. | 310/90.5 |

*Primary Examiner*—Emanuel T. Voeliz
*Assistant Examiner*—E. To
*Attorney, Agent, or Firm*—Jill M. Breedlove; Marvin Snyder

[57] ABSTRACT

In an active magnetic bearing system employing radial or thrust bearings, rotor shaft position is determined without requiring air gap position sensors, resulting in a high reliability system. The flux paths for each respective electromagnetic force actuator of the active magnetic bearing are isolated in order to minimize the magnetic coupling therebetween. In this way, the current (or magnetomotive force, mmf) in each respective actuator is functionally related to the flux therethrough, independent of the currents (or mmf's) in adjacent actuators. Application of a digital PWM pole voltage waveform during normal bearing operation results in a ripple current waveform at the PWM switching frequency. The resulting change in stator pole current and pole voltage are measured, and the average differential inductance is determined therefrom. Then, with knowledge of the differential inductance and the average pole current, the effective air gap length, air gap velocity, and magnetic flux are determined according to the inherent magnetization characteristic of the magnetic bearing.

12 Claims, 6 Drawing Sheets

BEARING AXES

INDUCTIVE AIR GAP ESTIMATION METHOD FOR ACTIVE MAGNETIC BEARINGS

RELATED PATENT APPLICATION

This application is related to commonly assigned U.S. patent application Ser. No. 07/970,197 of J. P. Lyons, M. A. Preston and G. B. Kliman and to commonly assigned U.S. patent application Ser. No. 07/970,196 of J. P. Lyons and M. A. Preston, both filed concurrently herewith and incorporated by reference herein.

FIELD OF THE INVENTION

The present invention relates to a method for determining rotor shaft position and additional state information (i.e., air gap velocity and magnetic flux) in an active magnetic bearing system, without requiring air gap position sensors.

BACKGROUND OF THE INVENTION

Active magnetic bearings have great potential for improving the efficiency of rotating machinery by: reducing or eliminating the complexity of bearing lubrication systems; enabling high rotational speeds; and providing active means of controlling vibrations in complex rotating masses. Recent advances in power electronics and control microprocessors have made active magnetic bearing systems feasible in, for example, gas turbine engine applications.

Presently, however, active magnetic bearings are unsuitable for high-reliability applications, such as aircraft engine rotor support and vibration control. A major problem is lack of accuracy and reliability of air gap position sensors used for determining rotor shaft position. Hence, it is desirable to provide a method for determining rotor gap position in an active magnetic bearing system, without requiring separate air gap position sensors.

SUMMARY OF THE INVENTION

In an active magnetic bearing system employing radial or thrust bearings, rotor shaft position is determined without requiring air gap position sensors, resulting in a high reliability system. The flux paths for each respective electromagnetic force actuator of the active magnetic bearing (e.g., comprising a stator pole-pair in a radial magnetic bearing) are isolated in order to minimize the magnetic coupling therebetween. In this way, the current (or magnetomotive force, mmf) in each respective actuator pole-pair is functionally related to the flux therethrough, independent of the currents (or mmf's) in adjacent actuator pole-pairs. Application of a digital pulse width modulated (PWM) voltage waveform to a stator pole during normal bearing operation results in a ripple current waveform at the PWM switching frequency. The resulting change in stator pole current and pole voltage are measured, and the average differential inductance is determined therefrom. Then, with knowledge of the differential inductance and the average pole current, the effective air gap length, air gap velocity, and magnetic flux are determined according to the inherent magnetization characteristic of the magnetic bearing.

BRIEF DESCRIPTION OF THE DRAWINGS

The features and advantages of the present invention will become apparent from the following detailed description of the invention when read with the accompanying drawings in which:

FIG. 1b graphically represents magnetically isolated control axes for the active magnetic bearing of FIG. 1a;

Figure 1A:
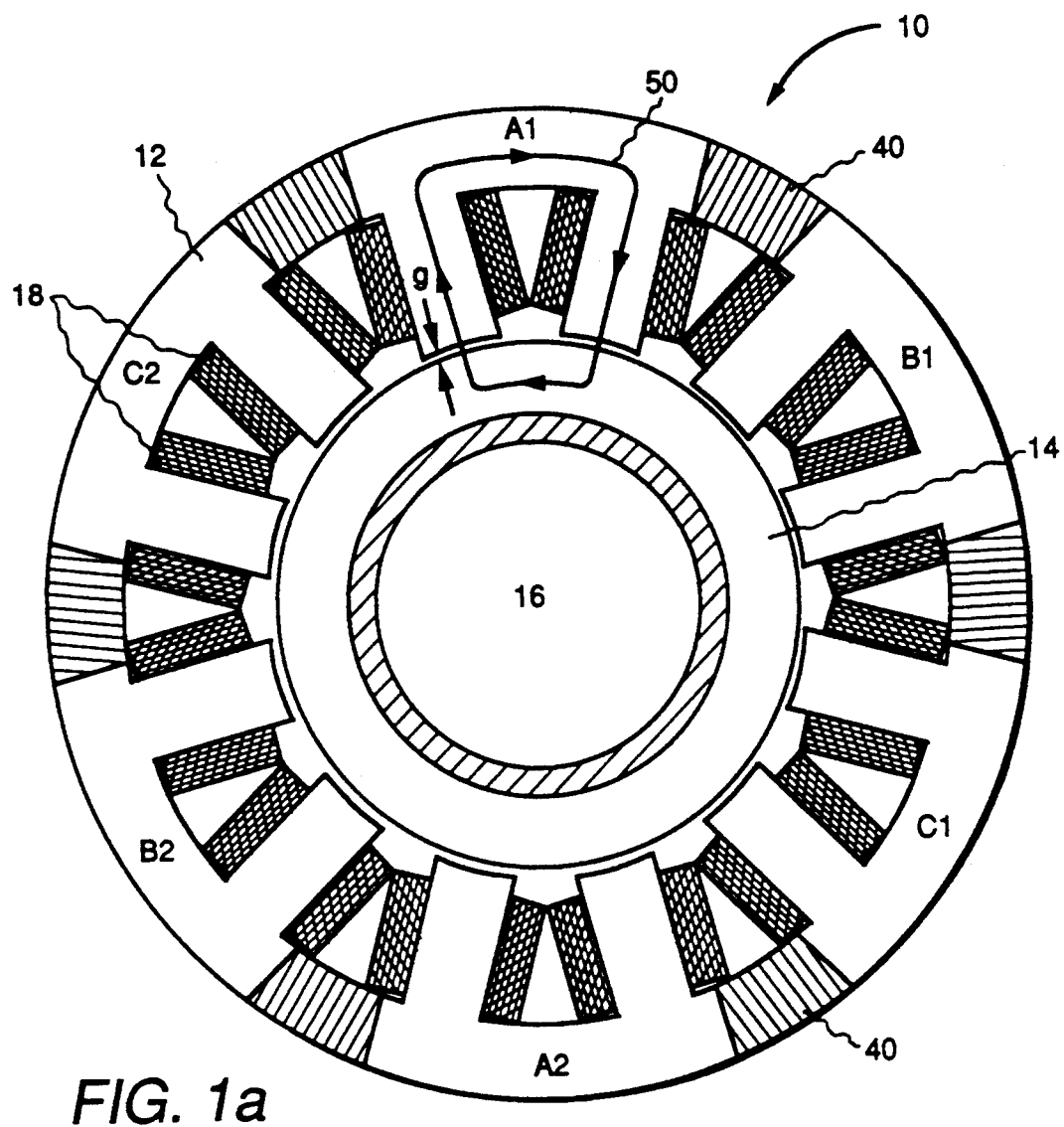
FIG. 1a is a front, partially cross sectional, view of an active radial magnetic bearing having isolated magnetic actuators in accordance with the present invention.
Figure 5:
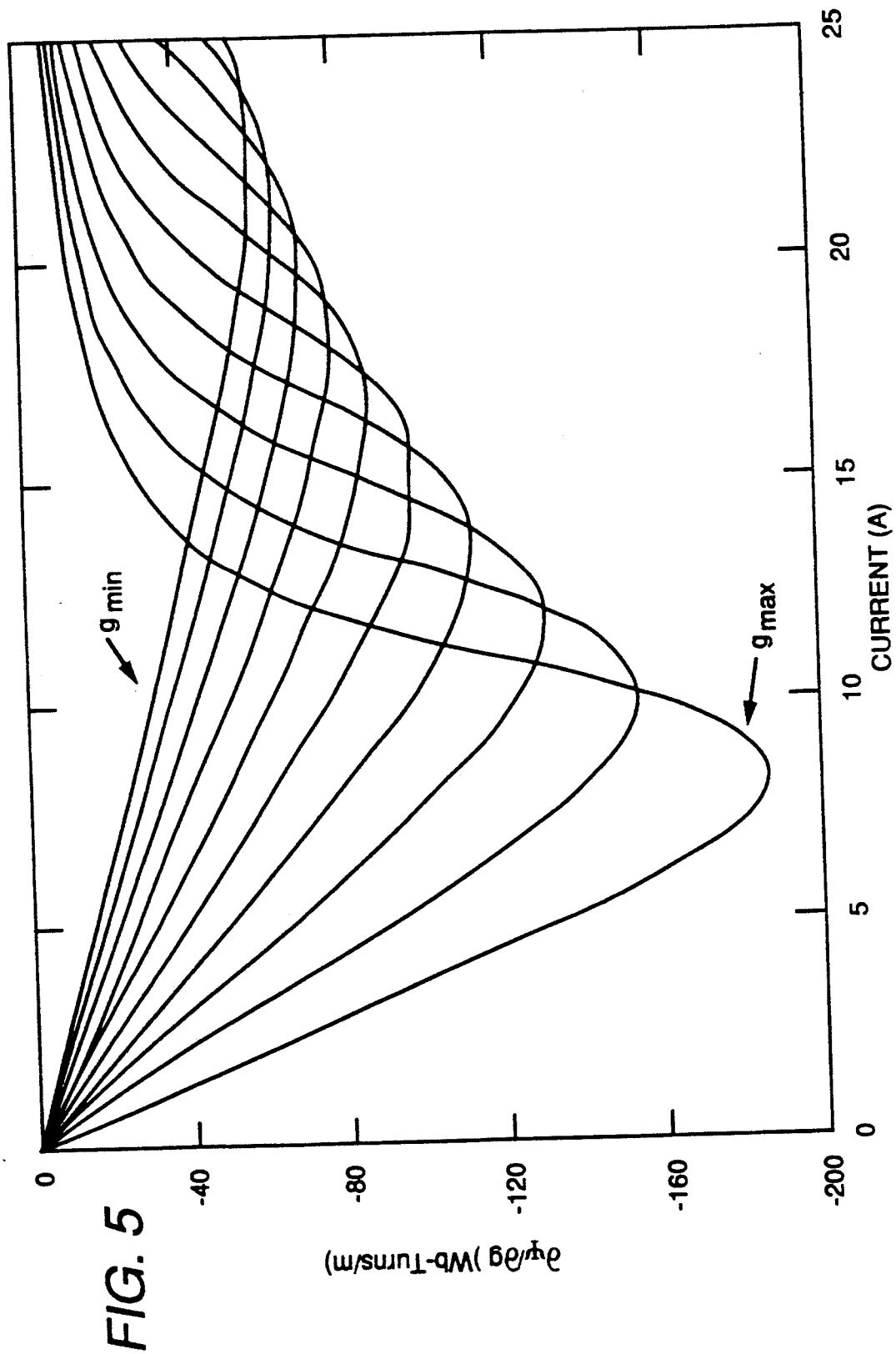
Figure 6:
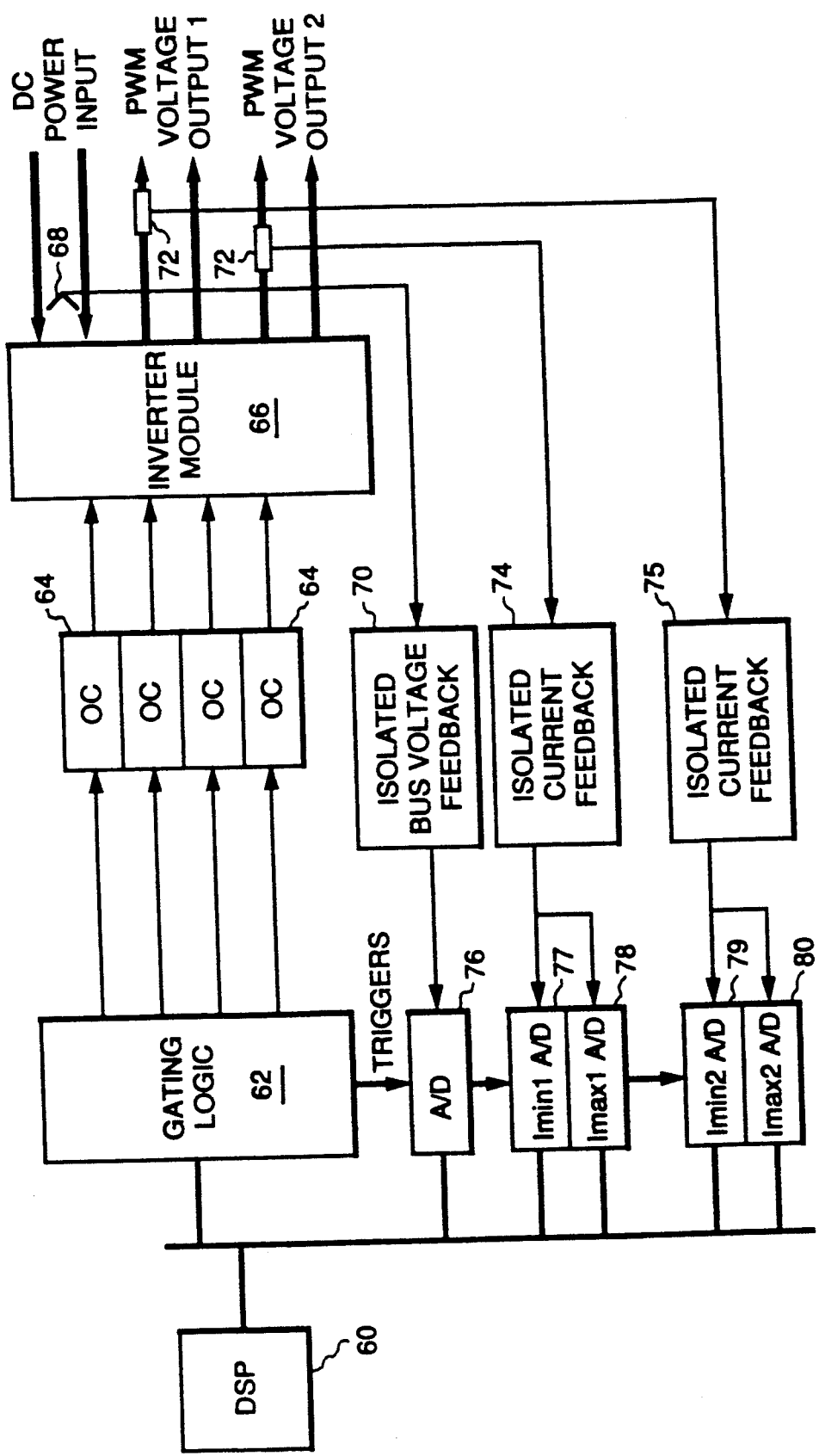

and current for a magnetic force actuator of an active radial magnetic bearing such as that of FIG. 1;

FIG. 5 is a graphical illustration of the magnetic actuator characteristic of $$\left(\frac{\partial \psi}{\partial g}\right)$$

given air gap length and current useful for air gap velocity calculation of an active radial magnetic bearing such as that of FIG. 1; and FIG. 6 is a block diagram of one implementation of an axis controller for controlling an active magnetic bearing in accordance with the present invention.

DETAILED DESCRIPTION OF THE INVENTION

FIG. 1 illustrates a fault-tolerant active radial magnetic bearing 10, such as described in commonly assigned U.S. patent application Ser. No. 07/970,197 of J. P Lyons, M. A. Preston and G. B. Kliman, cited hereinabove.

Figure 1B:
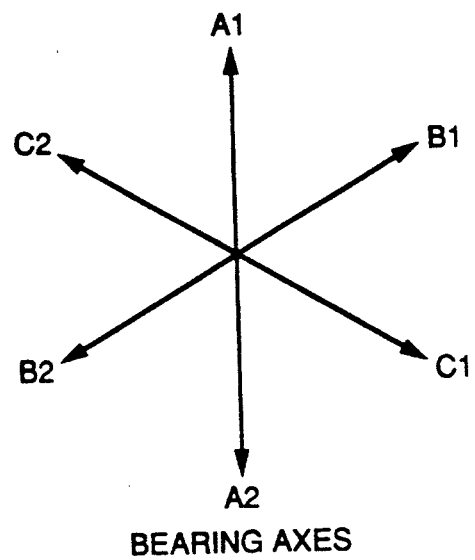

Magnetic bearing 10 includes a stator 12 and a rotor 14 mounted for rotation within stator 12 and coupled to a shaft 16. Each stator pole has a winding 18 wound thereon in well-known manner. By way of illustration, magnetic bearing 10 of FIG. 1a has three radial control axes, as indicated in FIG. 1b. In particular, stator 12 has twelve electromagnetic stator poles configured as six force-producing pole pairs A1, B1, C1, A2, B2, and C2, with a 60° radial spacing between pole-pairs. Two pole-pairs at 180° radial separation operate as a respective one of the control axes.

Stator 12 is segmented by situating a non-magnetic stator flux barrier 40 between adjacent pole-pairs. The stator flux barriers 40 provide magnetic isolation for each pole-pair and thus allow functioning force-actuation pole-pairs to continue operating even in such close proximity to faulted magnetic poles. Advantageously, any two of the three (or more) control axes are sufficient to maintain rotor suspension in the bearing system. Hence, bearing operation continues even in the presence of faults, such as, for example, faulted magnetic poles, power electronic shorts, and phase power loss.

Even greater fault tolerance may be achieved using more than three control axes.

In operation, the magnetic flux produced by the forcing current or magnetomotive force (mmf) in each pole winding 18 circulates through the stator poles of each respective pole pair and through the rotor and stator cores, crossing two air gap lengths g. An exemplary magnetic flux path 50 for pole-pair A1 is illustrated in FIG. 1.

According to the present invention, air gap position is electronically estimated, or inferred, by digitally controlling the pole currents in an active magnetic bearing having magnetically isolated force actuators (i.e., polepairs), such as that of FIG. 1.

Figure 2:
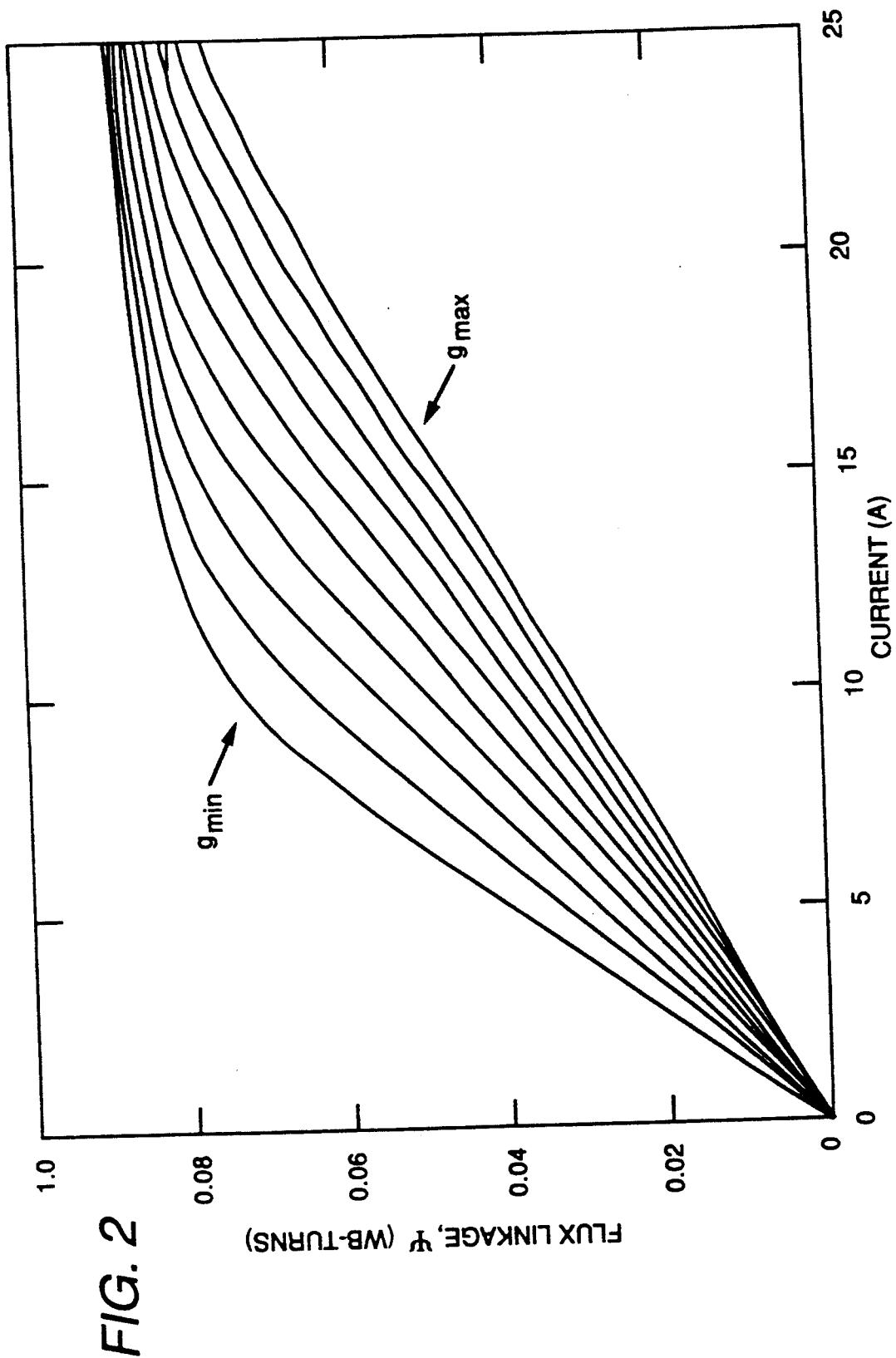
FIG. 2 is a graphical illustration of the magnetic characteristic of a force actuator pole-pair of an active radial magnetic bearing such as that of FIG. 1.

FIG. 2 illustrates magnetization characteristics (flux versus current) at various air gap lengths, from a minimum gap length $g_{min}$ to a maximum gap length $g_{max}$, for a typical electromagnetic actuator, i.e., pole-pair. At relatively low current levels, the magnetization characteristic is dominated by the reluctance of the air gap. Lower flux per unit current is achieved at larger air gaps. The curves become non-linear at relatively high excitation current levels due to effects of magnetic saturation.

Figure 3:
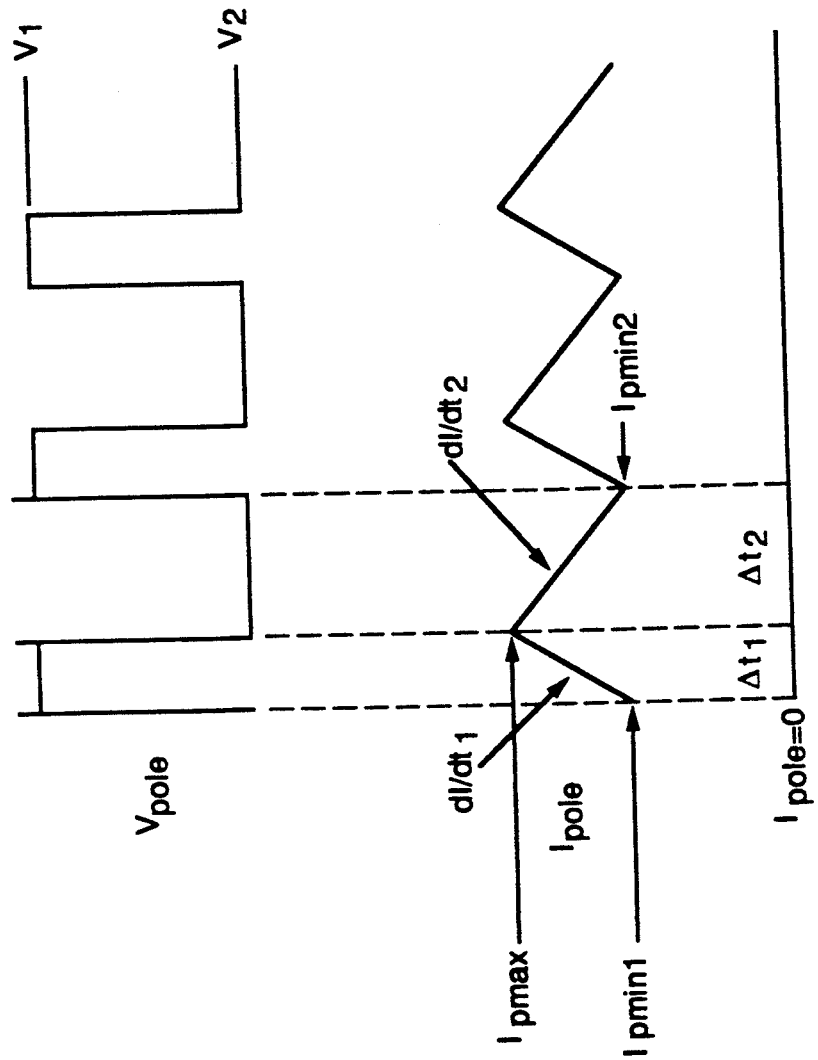
FIG. 3 is a graphical representation of a typical digital PWM voltage applied during normal bearing operation to a stator pole-pair and the resulting ripple pole current for the active radial magnetic bearing of FIG. 1.

FIG. 3 illustrates a digital pulse width modulated (PWM) voltage waveform applied to a pole-pair during normal bearing operation. The PWM voltage results in a ripple current waveform at the PWM switching frequency, also shown in FIG. 3. According to the present invention, the change in pole current ($\Delta I = I_{pmax} - I_{pmin}$) and the applied voltage $V_{pole}$ are measured using suitable current and voltage sensors, respectively. The average differential inductance is then computed over the switching period.

In particular, when a phase is on and $V_{pole} = V_1$, $$V_1 - IR = \frac{d\psi}{dt} = L\frac{dI}{dt} + \frac{\partial \psi}{\partial g}\frac{dg}{dt}, \quad (1)$$

where R represents the stator resistance, $\Psi$ represents the stator flux linkage, and L represents the stator inductance. Equation (1) can be approximated by:

$$V_1 - I_{avg1}R \approx \frac{\Delta \psi}{\Delta t_1} \approx L\frac{\Delta I_1}{\Delta t_1} + \frac{\Delta \psi}{\Delta g}\frac{\Delta g}{\Delta t_1}, \quad (2)$$

where $$I_{avg1} = \frac{I_{pmax} + I_{pmin1}}{2}. \quad (3)$$

and $\Delta t_1$ represents the time for which $V_{pole} = V_1$.

When the phase is off and $V_{pole} = V_2$, (during a time $\Delta t_2$), $$V_2 - IR = \frac{d\psi}{dt} = L\frac{dI}{dt} + \frac{\partial \psi}{\partial g}\frac{dg}{dt} \quad (4)$$

which can be approximated by:

$$V_2 - I_{avg2}R \approx \frac{\Delta \psi}{\Delta t_2} \approx -L\frac{\Delta I_2}{\Delta t_2} + \frac{\Delta \psi}{\Delta g}\frac{\Delta g}{\Delta t_2}. \quad (5)$$

where $$I_{avg2} = \frac{I_{pmax} + I_{pmin2}}{2}. \quad (3)$$

Assuming that $$\frac{\Delta g}{\Delta t_1} = \frac{\Delta g}{\Delta t_2}$$

(i.e., gap velocity remains constant throughout the PWM interval and $I_{avg1} = I_{avg2}$), then subtracting equation (5) from equation (2) to eliminate the velocity and IR terms term gives $$V_1 - V_2 \approx L\left(\frac{\Delta I_1}{\Delta t_1} + \frac{\Delta I_2}{\Delta t_2}\right) \quad (6)$$

from which the average differential inductance $L_{avg}$ over the switching cycle $\Delta t_1 + \Delta t_2$ can be calculated as $$L_{avg} = \frac{V_1 - V_2}{\frac{\Delta I_1}{\Delta t_1} + \frac{\Delta I_2}{\Delta t_2}}. \quad (7)$$

The effective air gap length is then determined from the inherent magnetization characteristic (FIG. 4) using $L_{avg}$ and $I_{avg}$, where $$I_{avg} = \frac{I_{avg1} + I_{avg2}}{2}.$$

According to one embodiment, two-dimensional interpolation of magnetization curves stored in a microprocessor is performed. Alternatively, a functional model of the magnetic bearing flux path can be employed. Accuracy is dependent on the speed at which the measurements, interpolations, and calculations can be made since the approximations of equations (2) and (5) assume constant air gap and rate of change of air gap. Note that FIG. 4 yields unique answers for restricted ranges of current—principally in the unsaturated or linear magnetic operating range.

Advantageously, the effects of changing air gap (represented by the term $$\frac{\partial \psi}{\partial g}\frac{dg}{dt}$$

in equations (1) and (4)) and the resistive drop IR are avoided by the air gap estimation method of the present invention, such that inductance for each stator phase is isolated and additional sensors (e.g., flux sensors) are not required.

Figure 4:
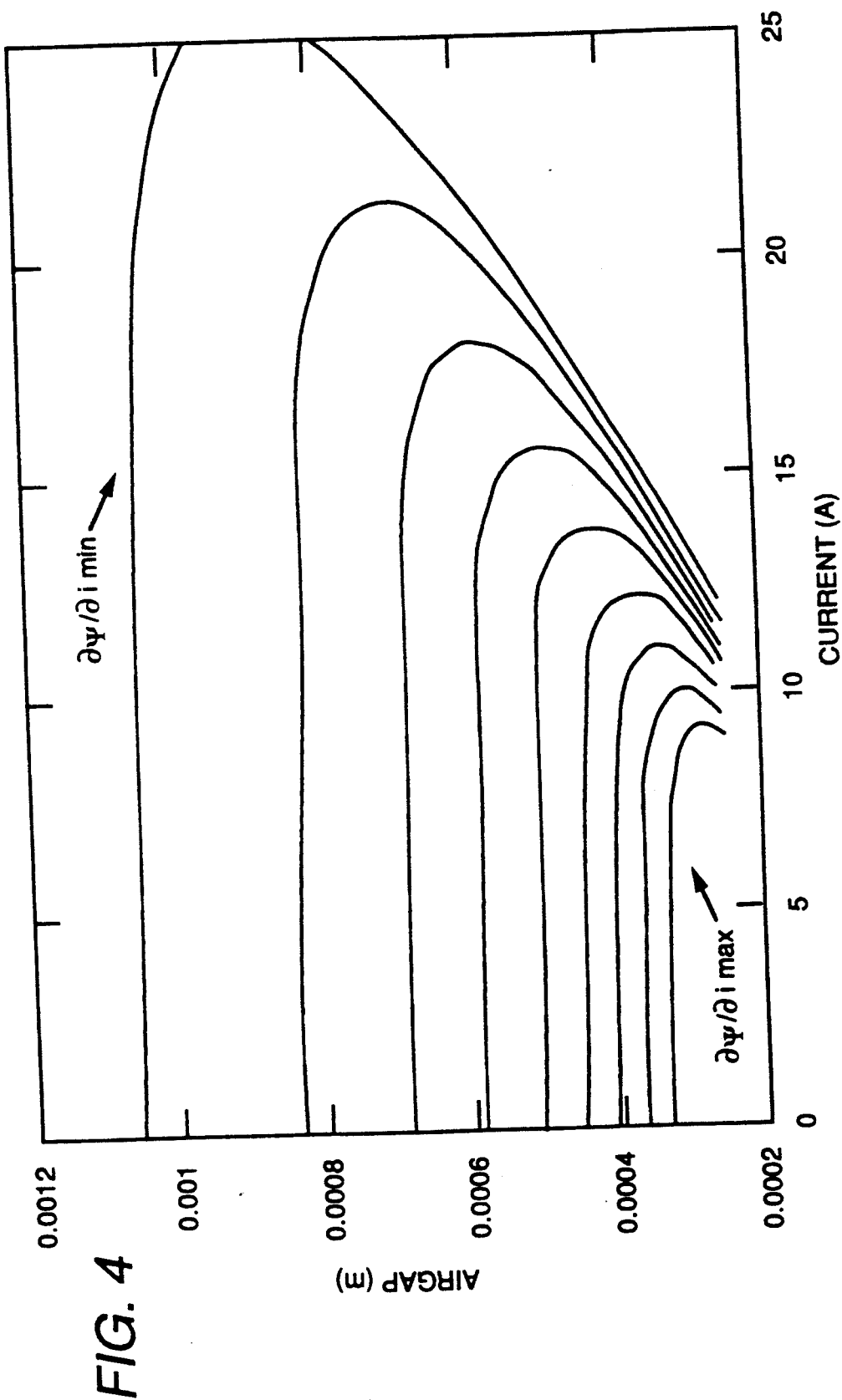
FIG. 4 is a graphical illustration of the magnetic characteristic used for lookup of air gap length given differential inductance $$\left(\frac{\partial \psi}{\partial i}\right)$$

This technique for position estimation can be applied at either high or low current levels; however, it is not effective just beyond the onset of magnetic saturation, due to non-unique air gap estimates (See FIG. 4). Thus, the specific active magnetic bearing application must be organized to have an available actuation pole in an appropriate current range. This is generally possible in most systems, where a single actuator at a time is active in each axis. It is also possible in actively biased bearings where the two magnetic actuators per axis are controlled by decreasing current in one magnetic actuator while simultaneously increasing current in the second magnetic actuator. In such case, estimates from the actuator having the lower current is used. Given the air gap position, the air gap velocity and magnetic flux level can be determined at any bearing current level.

Given the value of the air gap position g, however determined, this inference method can be extended according to the present invention to determine both the air gap velocity and magnetic flux levels. These measurements are useful in feedback control of the magnetic bearing. The flux-linkage, which is directly related to actuator force, can be determined by two-dimensional interpolation of the magnetic characteristic of FIG. 2 ($\Psi$ as a function of g and i) stored in a microprocessor. The air gap velocity component can be determined by summing equations (2) and (5), looking up $$\frac{\partial \psi}{\partial g}$$

from FIG. 5

$$(\frac{\partial \psi}{\partial g}$$

as a function of $\Psi$ and i), then computing $$\frac{\Delta g}{\Delta t} = \frac{V_1 + V_2 - 2I_{avg}R - L_{avg}\left(\frac{\Delta I_1}{\Delta t_1} - \frac{\Delta I_2}{\Delta t_2}\right)}{2\frac{\Delta \psi}{\Delta g}}.$$

One implementation of a controller for an active magnetic bearing according to the present invention is illustrated in FIG. 6. A digital signal processor (DSP) 60 provides desired PWM timing to a gating logic block 62. Gating logic block 62 provides gating signals, via optical couplers 64, to an inverter 66 for providing drive signals to an active magnetic bearing such as that of FIG. 1. DC bus voltage measurements are taken by a voltage sensor 68 and provided to a voltage feedback block 70. Current measurements are taken by sensors 72 and provided to current feedback blocks 74–75. The voltage and current measurements used in making the air gap position, velocity and flux measurements according to the present invention are provided via respective analog-to-digital (A/D) converters 76–80 to DSP 60.

Effectively, by the air gap estimation method of the present invention, each magnetic pole-pair is employed both for controlling air gap position and as an inductive feedback sensor, thereby eliminating the need for separate sensors. As a result, the parts count is reduced, and the robustness and reliability of the active magnetic bearing system are improved. The sensing process is non-intrusive in that it simply involves monitoring the electrical variables as the active magnetic bearing operates.

As a further advantage, all force actuation pole-pairs can be used to measure the rotor position, if desired. The result would be the equivalent of two position sensors per control axis, providing inherent redundancy because only one air gap measurement per control axis is generally required to locate the rotor shaft.

Application of the air gap estimation method of the present invention to radial magnetic bearings has been illustrated herein by way of example only. The air gap estimation method is applicable to other types of active magnetic bearings, such as thrust bearing applications. The technique is the same, involving isolation of the flux paths for the different electromagnetic force actuators, digital control of the pole current, determination of the incremental pole inductance by elimination of velocity and IR components, and determination of effective air gap length from the calculated incremental pole inductance.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for sensing air gap length in an active magnetic bearing having a rotor and a stator including a plurality of electromagnetic force actuators, comprising:

magnetically separating said force actuators such that each has a substantially isolated flux path;

measuring a voltage applied to at least one of said force actuators;

measuring a change in current in said force actuator resulting from application of said voltage thereto;

determining an average differential inductance of said force actuator from said voltage and said change in current; and determining the effective air gap length, air gap velocity, and magnetic flux from said change in current and said differential inductance according to predetermined flux versus current characteristics of said magnetic bearing.

2. The method of claim 1 wherein said average differential inductance $L_{avg}$ is determined according to:

$$L_{avg} = \frac{V_1 - V_2}{\frac{\Delta I_1}{\Delta t_1} + \frac{\Delta I_2}{\Delta t_2}},$$

where $V_1$ represents said voltage over a time $\Delta t_1$ and $\Delta I_1$ represents the change in current over the time $\Delta t_1$; and $V_2$ represents said voltage over a time $\Delta t_1$ and $\Delta I_2$ represents the change in current over the time $\Delta t_2$.

3. The method of claim 1 wherein the steps of determining the average differential inductance of said force actuator and determining the effective air gap length are performed by a microprocessor, said predetermined flux versus current characteristics being stored in microprocessor memory.

4. The method of claim 1 wherein the step of magnetically separating said force actuators such that each has a substantially isolated flux path involves configuring said stator to have at least six adjacent magnetic actuators configured such that each magnetic actuator is situated opposite from a corresponding magnetic actuator, adjacent magnetic actuators being separated by non-magnetic flux barriers, opposite pole pairs functioning as a magnetically isolated control axis, such that there are at least three control axes, only two of said control axes being required to maintain operation of said magnetic bearing.

5. The active magnetic bearing of claim 4 wherein said stator has three control axes.

6. The method of claim 1 wherein said active magnetic bearing is an actively biased magnetic bearing.

7. Apparatus for estimating air gap length in an active magnetic bearing having a rotor mounted for rotation within a stator and for coupling to a shaft, said stator including a plurality of electromagnetic force actuators, comprising:
- non-magnetic flux barriers for magnetically separating adjacent force actuators such that each has a substantially isolated flux path;
- voltage sensing means for measuring a voltage applied to at least one of said force actuators;
- current sensing means for measuring a change in current in said force actuator resulting from application of said voltage thereto;
- computer means for determining an average differential inductance of said force actuator from said voltage and said change in current, said computer means determining the effective air gap length, air gap velocity, and magnetic flux from said change in current and said differential inductance according to predetermined flux versus current characteristics of said magnetic bearing.

8. The apparatus of claim 7 wherein said computer means determines said average differential inductance $L_{avg}$ according to:

$$L_{avg} = \frac{V_1 - V_2}{\frac{\Delta I_1}{\Delta t_1} + \frac{\Delta I_2}{\Delta t_2}},$$

where $V_1$ represents said voltage over a time $\Delta t_1$ and $\Delta I_1$ represents the change in current over the time $\Delta t_1$; and $V_2$ represents said voltage over a time $\Delta t_2$ and $\Delta I_2$ represents the change in current over the time $\Delta t_2$.

9. The apparatus of claim 7 wherein said computer means comprises a microprocessor, said predetermined flux versus current characteristics being stored in microprocessor memory.

10. The apparatus of claim 7 wherein said electromagnetic force actuators comprise stator pole-pairs, opposing stator pole-pairs comprising a magnetically isolated control axis, such that there are at least three control axes, only two of said control axes being required to maintain operation of said magnetic bearing.

11. The apparatus of claim 10 wherein said stator has three control axes.

12. The apparatus of claim 7 wherein said active magnetic bearing is an actively biased magnetic bearing.

* * * * *